US008128296B2

(12) United States Patent
Viglione et al.

(10) Patent No.: US 8,128,296 B2
(45) Date of Patent: Mar. 6, 2012

(54) SHUTTER ASSEMBLY

(75) Inventors: David Viglione, Rochester, NY (US); Stephen T. Pasquarella, Rochester, NY (US)

(73) Assignee: VA, Inc., Rochester, NY (US)

( * ) Notice: Subject to any disclaimer, the term of this patent is extended or adjusted under 35 U.S.C. 154(b) by 339 days.

(21) Appl. No.: 12/359,953

(22) Filed: Jan. 26, 2009

(65) Prior Publication Data
US 2010/0189431 A1 Jul. 29, 2010

(51) Int. Cl.
G03B 9/08 (2006.01)
(52) U.S. Cl. .................................. 396/463; 396/471
(58) Field of Classification Search .................. 396/463, 396/467, 468, 471, 493, 508
See application file for complete search history.

(56) References Cited

U.S. PATENT DOCUMENTS

| 3,533,345 | A | 10/1970 | Slam |
| 3,595,553 | A | 7/1971 | Vincent |
| 3,664,251 | A | 5/1972 | Vincent |
| 4,060,313 | A | 11/1977 | Kondo |
| 4,121,235 | A | 10/1978 | Fujita et al. |
| 4,265,530 | A | 5/1981 | Petersen |
| 4,466,723 | A | 8/1984 | Ikari et al. |
| 4,702,583 | A | 10/1987 | Yoshino et al. |
| 4,724,452 | A | 2/1988 | Mody et al. |
| 4,772,904 | A | 9/1988 | Otsuka et al. |
| 4,881,093 | A | 11/1989 | Dowe |
| 5,117,137 | A | 5/1992 | Kobayashi |
| 5,173,728 | A | 12/1992 | Sangregory et al. |
| 5,264,896 | A * | 11/1993 | Lee et al. ........................ 396/235 |
| 5,337,110 | A | 8/1994 | Dowe |
| 5,489,959 | A | 2/1996 | Akada |
| 5,555,059 | A | 9/1996 | Seo et al. |
| 5,705,873 | A | 1/1998 | Sato |
| 6,033,131 | A | 3/2000 | Ghosh et al. |
| 6,652,165 | B1 | 11/2003 | Pasquarella et al. |
| 6,714,733 | B2 | 3/2004 | Kobayashi |
| 6,806,985 | B1 | 10/2004 | Devenyi |
| 7,104,707 | B2 | 9/2006 | Miyawaki |
| 7,259,922 | B2 | 8/2007 | Fukasawa |
| 2003/0062788 | A1 | 4/2003 | Aoshima |

(Continued)

FOREIGN PATENT DOCUMENTS
GB 2235541 A 3/1991
(Continued)

OTHER PUBLICATIONS

International Search Report and Written Opinion dated Mar. 28, 2008 re International Application No. PCT/US06/60186 filed Nov. 13, 2006—8 pages.

(Continued)

*Primary Examiner* — Clayton E LaBalle
*Assistant Examiner* — Warren Fenwick
(74) *Attorney, Agent, or Firm* — Finnegan, Henderson, Farabow, Garrett & Dunner

(57) ABSTRACT

A shutter assembly includes a plurality of shutter blades movable between an open position and a closed position, a drive ring having first and second oppositely-facing sides, at least one of the shutter blades being movably coupled to the first side, and a first permanent magnet coupled to the second side of the drive ring. The shutter assembly also includes a first solenoid selectively energizable to alternately attract and repel the first permanent magnet along an arcuate path beneath the first solenoid, thereby transitioning the plurality of shutter blades between the open and closed positions. The shutter assembly also includes a sensor assembly configured to detect a location of the first permanent magnet along the path.

21 Claims, 9 Drawing Sheets

U.S. PATENT DOCUMENTS

| | | | |
|---|---|---|---|
| 2004/0008425 A1 | 1/2004 | Miyawaki | |
| 2004/0258405 A1 | 12/2004 | Shiratori et al. | |
| 2005/0041137 A1 | 2/2005 | Ezawa et al. | |
| 2007/0110432 A1* | 5/2007 | Viglione et al. | 396/465 |
| 2007/0297791 A1* | 12/2007 | Fukasawa | 396/506 |

FOREIGN PATENT DOCUMENTS

WO      2007089569 A2      8/2007

OTHER PUBLICATIONS

McLeod, et al.: Advanced electro-mechanical micro-shutters for thermal infrared night vision imaging and targeting systems, pp. 1-10.

Melles Griot Custom Shutters, www.mellesgriot.com. pp. 1-2.

Melexis: MLX90316 Rotary Position Sensor IC, 3 pages www.melexis.com/Sensor_ICs_Hall_effect/Triaxis_Hall_ICs/MLX90316_566.aspx.

Office Action in corresponding Chinese Patent Application No. 200680050297.6, along with an English language Summary of the Office Action. (7 pages).

Supplementary European Search Report from European Patent Application No. EP 06839850,2, dated Jun. 8, 2009.

PCT—Notification of Transmittal of the International Search Report and the Written Opinion of the International Searching Authority, or the Declaration; mailed Jan. 4, 2010.

PCT—International Search Report issued in corresponding International Application No. PCT/US2009/036872 (3 pages).

PCT—Written Opinion of the International Searching Authority issued in corresponding International Application No. PCT/US2009/036872 (5 pages).

USPTO Office Action in corresponding U.S. Appl. No. 12/046,958; mailed Jan. 6, 2010 (10 pages).

* cited by examiner

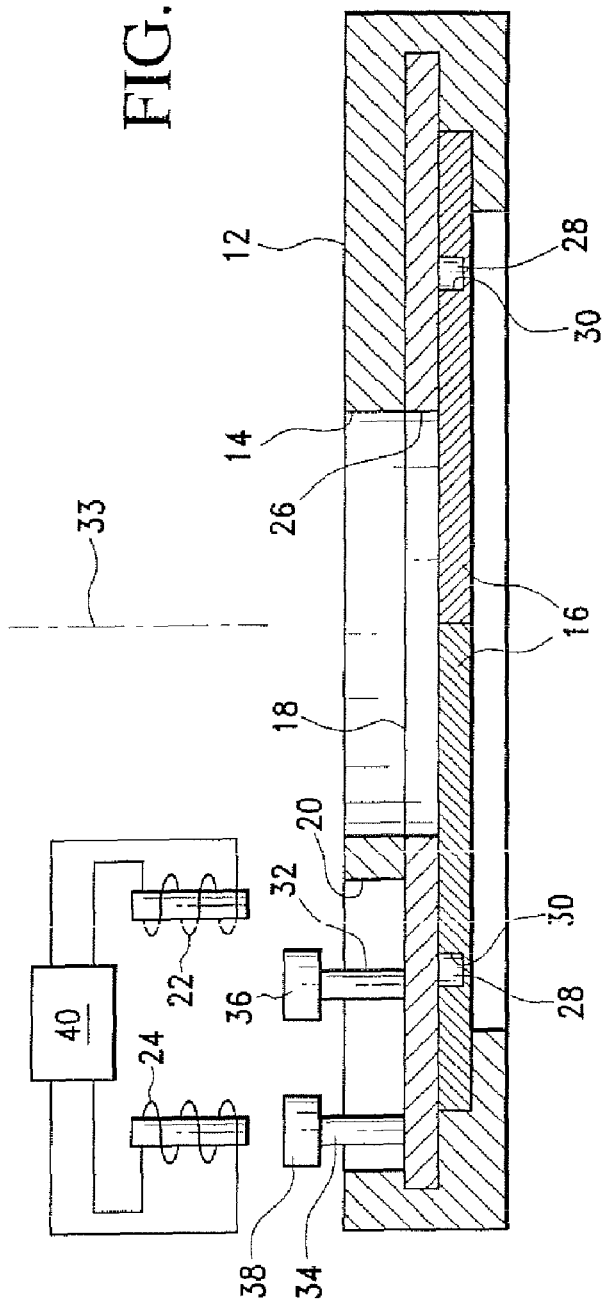
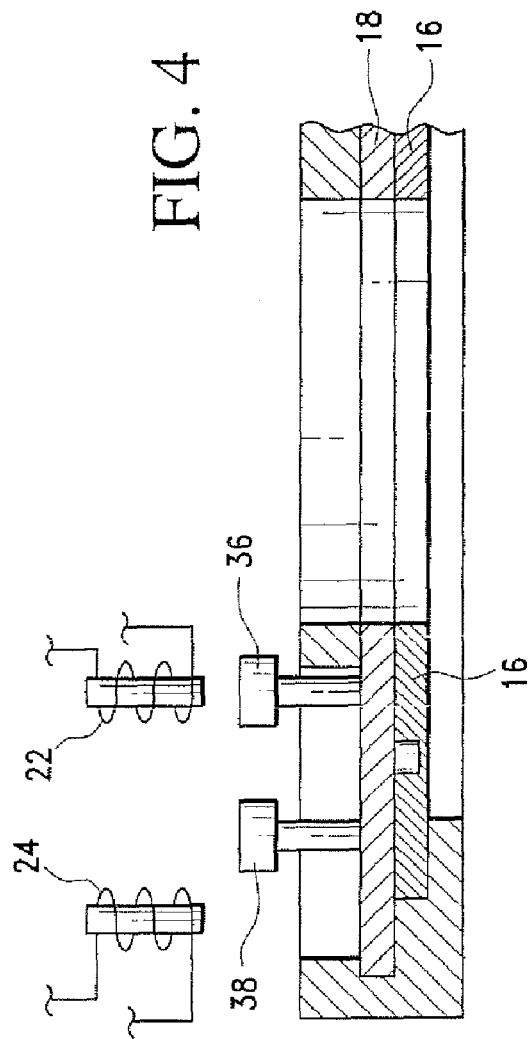

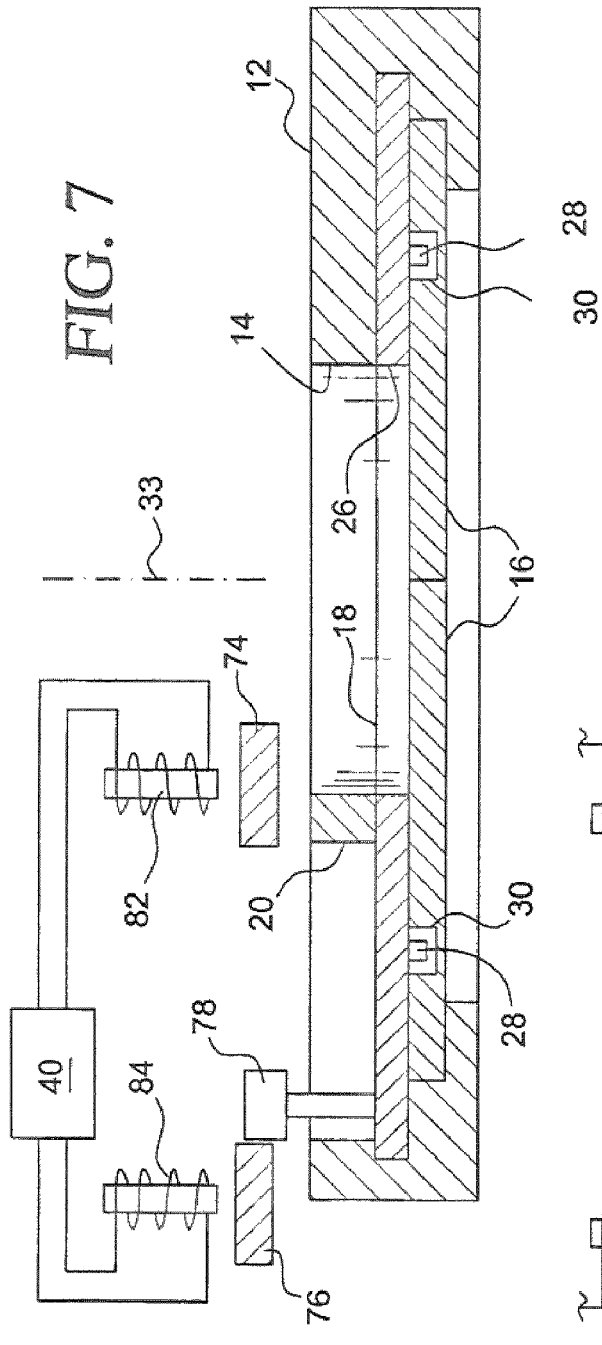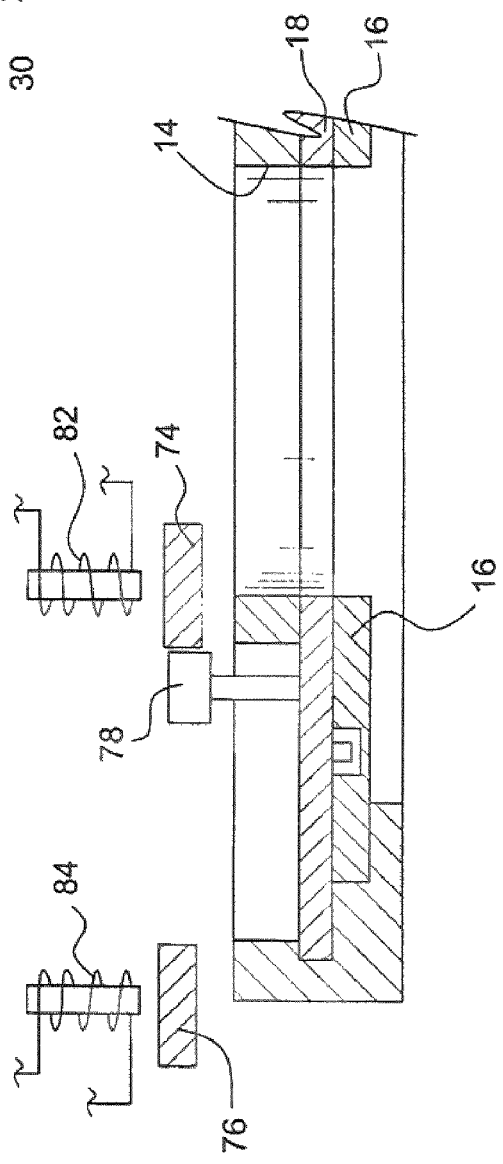

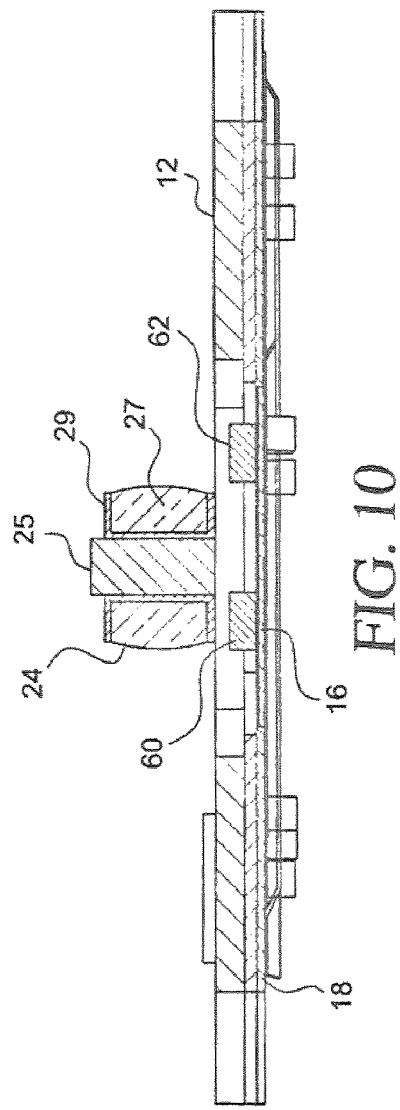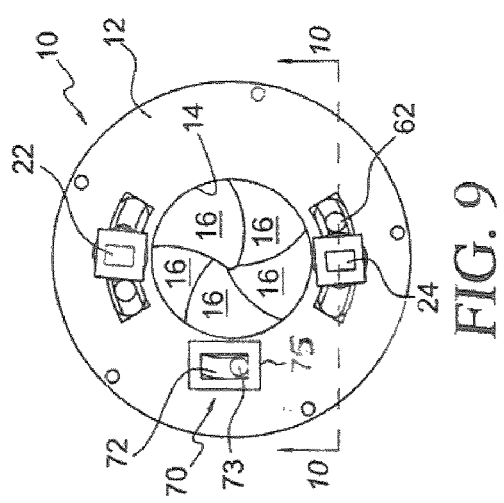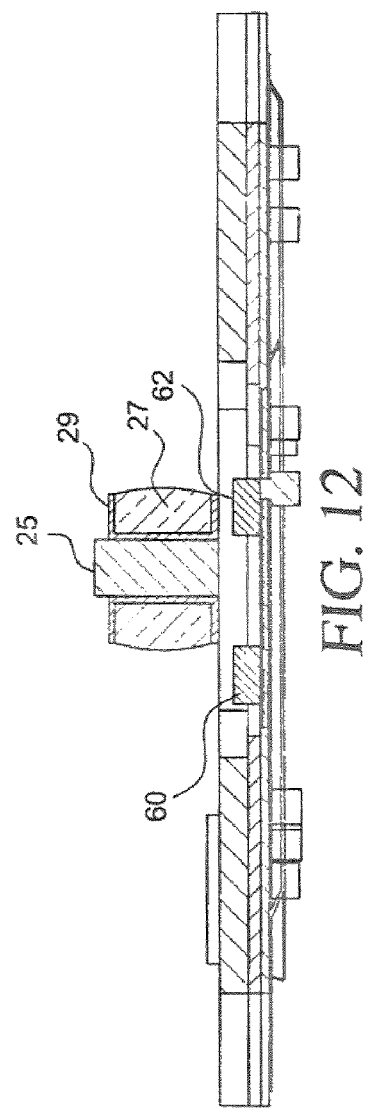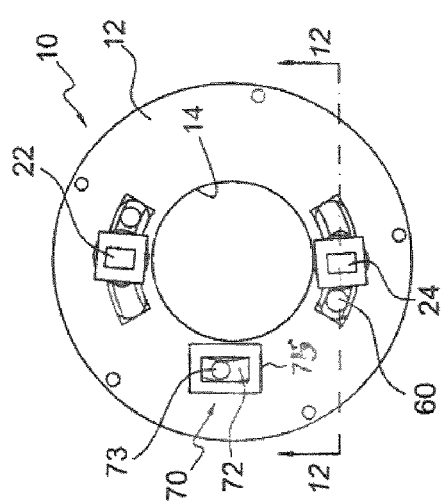

SHUTTER ASSEMBLY

CROSS-REFERENCE TO RELATED APPLICATIONS

None.

STATEMENT REGARDING FEDERALLY SPONSORED RESEARCH OR DEVELOPMENT

Not Applicable.

REFERENCE TO A "SEQUENCE LISTING"

Not applicable.

BACKGROUND OF THE INVENTION

1. Field of the Invention

The present invention relates generally to shutter assemblies and more particularly to a photographic-type shutter that relies on electromagnetic forces to open and close and which is, in one embodiment, self-damping to reduce impact and rebound when the shutter is opened or closed.

2. Description of Related Art

Electrically operated lens shutters used in various types of photographic and laboratory equipment are well known in the art. Lens shutters especially adapted for high speed opening and closing can operate in fractions of a second. An open/close cycle can take place in 30-40 milliseconds or less and repeated cycles at frequencies of 30 cycles per second are common.

Lens shutters generally are of two types. In one type, a so-called "guillotine" shutter has one or two thin, metal blades or leaves arranged to cover a lens opening. Pivot connections allow each blade to swing between a closed position where the blades cover the lens opening and an open position where the blades are drawn aside from the lens opening.

In a second type of shutter a plurality of pivotally mounted blades, usually five, is arranged around the lens opening. Each blade is connected to a rotatable drive ring. In the operation of these shutters, the rotation of the drive ring in one direction causes the blades to swing in unison to an open position. Counter rotation of the ring swings the blades to a closed position over the lens opening after exposure. Generally a linear electric motor is used to activate the shutter. When activated, the linear motor pulls on a lever arm that rotates the drive ring to open the shutter. To close the shutter the motor is deactivated and a spring causes the counter rotation of the drive ring to close the shutter. As noted above, shutters of this sort can cycle open and close 30 times per second.

It is common in both types of shutters to provide a shock absorber or damper that absorbs the impact as the blades are pivoted between the open and closed positions. In this respect, reference is made to various US patents including U.S. Pat. Nos. 3,595,553; 3,664,251 and 6,652,165 the disclosures of which are incorporated herein by reference. As disclosed in these references, the shock absorber operates to stop the shutter blade very rapidly, yet softly and without damage. There also is little or no bounce as the shutter first is snapped open by the linear electric motor and then is snapped closed by the spring when the motor is deenergized.

In some applications, however, it is desirable to hold the shutter open for an extended period to prolong the exposure time. In these cases it has been the practice to keep the motor activated for the duration of the exposure in order to hold the shutter open against the bias of the spring urging the shutter to a closed opposition.

Maintaining power to the coil of a linear electric motor for an extended period has its drawbacks due mainly to the resulting generation of heat. If not dissipated, the heat could adversely affect the alignment of the optics, cause image distortion and shorten the life of the motor and other heat sensitive components of the shutter system. A fan, heat sink or heat dissipating fins that normally can solve a heat-generating problem are not appropriate in many applications. For example fans are of little use if the shutter is located in a vacuum environment. In military and space exploration applications weight may be an issue so the use of any additional component such as a heat sink or heat radiating fins is not appropriate. Reference is made to U.S. Ser. No. 11/099,744, as disclosing a shutter assembly that is bi-stable in that it allows the shutter to remain open or closed for long periods without generating excessive heat.

In some applications space also is a limitation. Space limitations particularly in the region of the shutter opening dictate the parameters of size and placement of apparatus for holding the shutter open. For example, components placed near the shutter opening must have a relatively low profile so as not to interfere with the cone angle of the light passing through the open shutter. Space limitations also complicate the substitution of one shutter assembly for another as in changing shutter size while maintaining the same base structure.

As noted above, most prior art shutter assemblies mechanically couple a linear electric motor to the shutter for opening and closing the lens opening. For proper operation, particularly at high speeds, the mechanical linkage must be precisely made and the movement of the linkage must be dampened. To applicant's knowledge elimination of a damper system entirely has not been attempted or if attempted, has not been commercially successful.

Accordingly, it is an object of the present invention to provide an operating system for a rotary shutter that eliminates the need for a mechanical linkage between an actuator and the shutter to open and close the shutter.

Another object of the present invention is to provide is to provide a rotary shutter having an electromagnetic operating system.

A further object of the present invention is to provide a method of operating a rotary shutter utilizing electromagnetic energy for opening and closing the shutter.

BRIEF SUMMARY OF THE INVENTION

In the present invention a shutter operating system is provided that depends on electromagnetic energy to operate shutter blades so that direct mechanical linkage between a drive motor and the shutter blades reduced or is eliminated entirely. In this respect the present invention utilizes a permanent magnet and solenoid system to operate the shutter blade wherein the movement of the magnet causes the shutter blade to move between an open and a closed position over a lens opening. In one embodiment of the invention a single permanent magnet is moved between a pair of spaced coils by selectively energizing first one coil then the other. The movement of the magnet results in the opening and closing of the shutter. In this respect the magnet may be attached directly to a shutter blade or in the case of a rotary shutter, the magnet is attached to a drive ring that in turn is mechanically coupled to the shutter blades.

In a preferred embodiment, there are two permanent magnets associated with the shutter blades and there are two fixed coils, one associated with each magnet. The space between the coils is slightly greater than the spacing between the magnets so that if one of the coils is aligned with its associated magnet, the other coil is slightly off set in an outboard direction from its associated magnet. With this arrangement energizing the aligned magnet acts to repel or push away its associated magnet towards the other coil. This moves the shutter blades for example to an open position and also moves the second magnet towards its associated coil. Proper directional movement is assisted by energizing the second solenoid to attract its associated permanent magnet.

As the second magnet approaches the second coil it is attracted to the core of the second coil. The movement of the second magnet then is arrested when its magnetic field captures the core of the second coil. This holds the position of the shutter even after power to both solenoids is cut off.

To swing the shutter blades in the opposite direction, the second coil is energized with a reversed polarity to repel or push away the second magnet. This moves the shutter blades in the opposite direction or towards a closed position and at the same time the first magnet is moved towards its associated coil. Proper directional movement is assisted by energizing the first coil with a reversed polarity so it acts to attract its associated permanent magnet.

As noted above, there is no physical connection between the fixed coils that actuate the shutter and the magnets that cause the shutter blades to move. Accordingly the actuator is mechanically isolated from the shutter blades if the permanent magnets are connected directly to the shutter blades. In cases where the magnets are attached to a drive ring, the number of critical mechanical linkage members is reduced. Also there is no mechanical impacting at the end of travel as the shutter blades open and close so the system is self-damping. Instead the magnetic field of each permanent magnet, as it captures the core of each coil, attenuates the motion of any rebound of the permanent magnet without mechanical damping as it fixes the position of the shutter blades. This does not preclude however the use of a mechanical damper in association with the magnetic damping.

Accordingly, in an exemplary embodiment of the present disclosure, a shutter assembly includes a plurality of shutter blades movable between an open position and a closed position, a drive ring having first and second oppositely-facing sides, at least one of the shutter blades being movably coupled to the first side, and a first permanent magnet coupled to the second side of the drive ring. The shutter assembly also includes a first solenoid selectively energizable to alternately attract and repel the first permanent magnet along an arcuate path beneath the first solenoid, thereby transitioning the plurality of shutter blades between the open and closed positions. The shutter assembly also includes a sensor assembly configured to detect a location of the first permanent magnet along the path.

In another exemplary embodiment of the present disclosure, a method of controlling a plurality of shutter blades includes providing a shutter assembly. In such an exemplary embodiment, the shutter assembly includes a drive ring having first and second oppositely-facing sides, at least one shutter blade of the plurality of shutter blades being movably coupled to the first side, a first permanent magnet coupled to the second side of the drive ring, and a first solenoid selectively energizable to alternately attract and repel the first permanent magnet along an arcuate path beneath the first solenoid. The shutter assembly also includes a sensor assembly configured to detect a location of the first permanent magnet along the path. The exemplary method also includes moving the plurality of shutter blades between an open position exposing a central opening of the shutter assembly and a closed position, sensing the location of the first permanent magnet with the sensor assembly, and reducing an electrical signal applied to the first solenoid, while the plurality of shutter blades is in transit between the open and closed positions, in response to the sensed location.

In an additional exemplary embodiment of the present disclosure, a method of controlling a plurality of shutter blades includes providing a shutter assembly. The shutter assembly includes a drive ring having first and second oppositely-facing sides, the plurality of shutter blades being movably mounted to the first side, a permanent magnet coupled to the second side of the drive ring, and first and second solenoids selectively energizable to alternately attract and repel the permanent magnet along an arcuate path beneath the first and second solenoids. The shutter assembly also includes a sensor assembly configured to sense a location of the permanent magnet along the path. The method also includes rotating the drive ring about a central opening of the shutter assembly to transition the plurality of shutter blades between an open position exposing the central opening and a closed position, sensing the location of the permanent magnet with the sensor assembly while rotating the drive ring, and reducing an electrical signal applied to at least one of the first and second solenoids, while rotating the drive ring, in response to the sensed location.

BRIEF DESCRIPTION OF THE SEVERAL VIEWS OF THE DRAWING(S)

FIG. 3 is a sectional view taken generally along lines 3-3 of FIG. 1.

FIG. 4 is a sectional view similar to FIG. 3 only showing the shutter assembly in the open position.

FIG. 7 is a sectional view similar to FIG. 3 only showing another embodiment of the invention with the shutter assembly in a closed position.

FIG. 8 is a sectional view similar to FIG. 7 only shown the shutter assembly of FIG. 7 in the open position.

FIG. 9 is a plan view of still another embodiment of the invention showing the shutter in a closed position.

FIG. 10 is a view on a larger scale taken along lines 10-10 of FIG. 9.

FIG. 11 is a plan view showing the shutter assembly of FIG. 9 in an open position.

FIG. 12 is a view on a larger scale taken along lines 12-12 of FIG. 11.

DETAILED DESCRIPTION OF THE INVENTION

Figure 1:
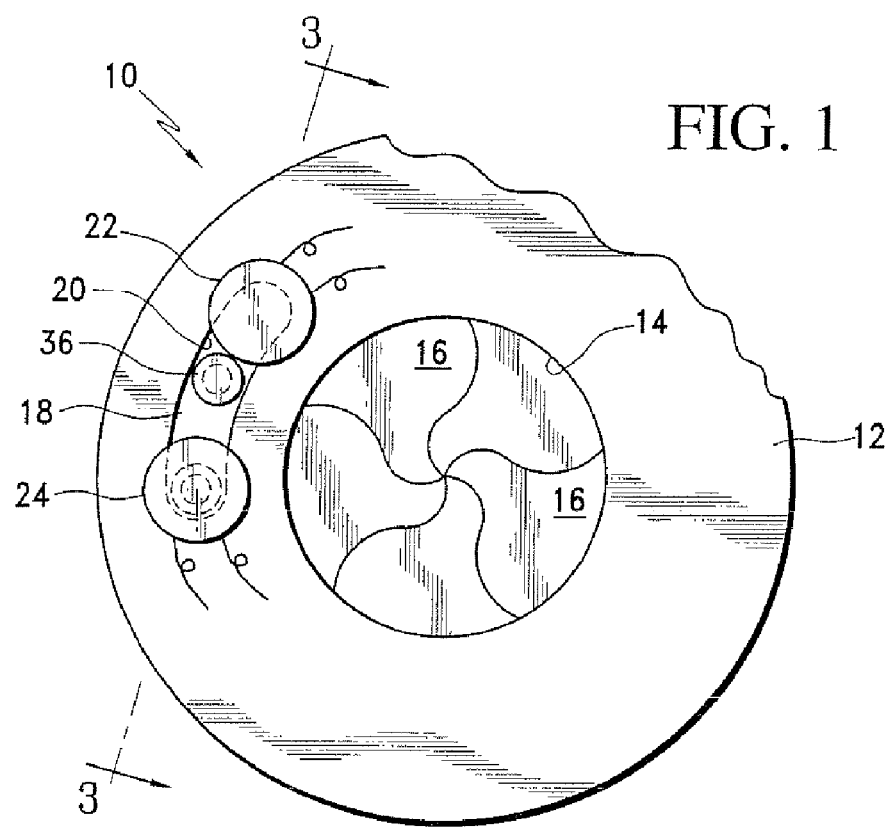
FIG. 1 is a plan view of a shutter assembly showing a base plate with components supported by the base plate removed.

Referring to the drawings, FIG. 1 shows a shutter assembly of the present invention generally indicated at 10, employing the self-damping activation system. The shutter is a type that can be used in any photographic, scientific or calibration application that requires one or more cycles of opening and closing of a shutter opening by driving one or more shutter blade across the opening. In such systems it is common to provide a shock absorber or damper that absorbs the impact as the blades move, usually by pivoting, between the open and closed positions. In this respect, reference is made to various US patents including U.S. Pat. Nos. 3,595,553; 3,664,251 and 6,652,165 the disclosures of which are incorporated herein by reference.

The shutter includes a base plate 12 having a shutter opening 14. The shutter opening is open and closed by moving a plurality of shutter blades 16 (usually five) in a pivoting action across the shutter opening. In prior art shutters the shutter blades are operated by a linear motor mounted to the base plate. The motor acts through a mechanical linkage to rotate a driver plate wherein the rotation of the driver plate in a to and fro motion acts to open and close the shutter blades. Also mounted to the base plate in the prior art is a damping system that acts as a shock absorber to stop the shutter blade very rapidly, yet softly and without damage. The damping system also produces little or no bounce as the shutter first is snapped open by the action of the linear electric motor and then is snapped closed by a spring mechanism.

The present invention also makes use of a conventional drive ring 18, a portion of which is seen in FIG. 1 through an elongated opening 20 in the base plate. Carried by the base plate are spaced solenoids 22, 24. The solenoids are positioned over the elongated opening 20 for purposes set out hereinbelow.

As shown in FIGS. 3 and 4, the drive ring 18 has an opening 26 that aligns with the shutter opening 14. Extending from the drive ring are pins 28. These pins extend into a corresponding cam slot 30 formed in each of the shutter blades. With this arrangement, the rotation of the drive ring to and fro about an axis 33 that aligns with the axis of the lens opening will cause the shutter blades to pivot between open and closed positions.

Extending from the drive ring 18 and through the opening 26 in the base plate are a pair of posts 32, 34. These posts together with other components described thus far are all formed of a non-magnetic material such as stainless steel. However, supported on each post 32, 34 is a permanent magnet 36, 38 respectively. The permanent magnets 36, 38 are each associated with one of the solenoids 22, 24 respectively.

Figure 2:
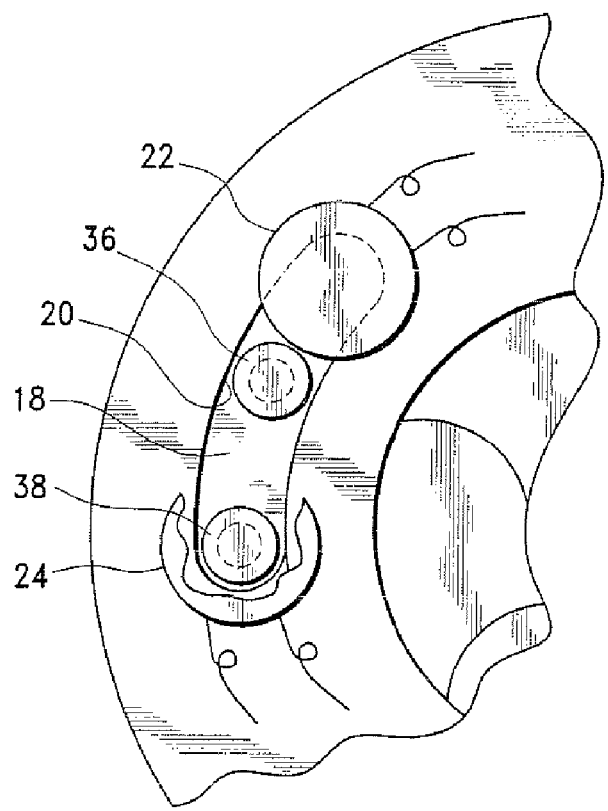
FIG. 2 is a view of a portion of FIG. 1 on an enlarged scale with portions broken away.

As best seen in FIG. 2, the spacing between magnets 36,38 is slightly less than the spacing between their associated solenoids 22, 24. Accordingly, when the permanent magnet 38 is in axial alignment with the core of its associated solenoid 24, the permanent magnet 36 is inboard of its solenoid 22. This difference in spacing is equal to the throw required to move the shutter blades between an open and a closed position.

In operation and with the shutter in the closed position as shown in FIGS. 1, 2 and 3 with the solenoids not energized, the permanent magnet 38 is attracted to the core of the solenoid 24 by magnetic attraction and aligns with the axis of the solenoid core. The second magnet 36 is far enough away from its associated solenoid 22 that the attractive force between the two is not enough to overcome the attraction between the magnet 38 and the core of the solenoid 24. Thus, even with no power applied to either coil, the shutter is stable and is locked in a closed position.

To open the shutter, a control 40 operates to energize both solenoids. Solenoid 24 is energized with a polarity that repels magnet 38 while the solenoid 22 is energized with a polarity that attracts its associated magnet 36. The combination of the repelling action between the solenoid 24/permanent magnet 38 and the attraction between the solenoid 22/permanent magnet 36 propels the drive ring 28 in a shutter opening direction. When the magnet 36 comes into alignment with the core of its associated solenoid 22 the motion of the drive ring is arrested and stopped so as to lock the shutter blades in an open position as shown in FIG. 4.

Deenergizing both solenoids will allow the shutter blades to remain in an open position until the current applied to the solenoids is reversed to reverse the polarity of the solenoids. Accordingly, to close the shutter blades control 40 is operated to energized solenoid 22 with a polarity that repels magnet 36 while the solenoid 24 is energized with a polarity that attracts its associated magnet 38. The combination of the repelling action between the solenoid 22/permanent magnet 36 and the attraction between the solenoid 24/permanent magnet 34 propels the drive ring 28 in the opposite and shutter closing direction. When the magnet 38 comes into alignment with the core of its associated solenoid 24 the motion of the drive ring is arrested and stopped so as to lock the shutter blades in an open position.

Delaying the reversal of the current will allow the shutter to remain in the open position for the time of the delay. Conversely, reversing the current soon after opening will cause the shutter to open and close quickly.

As noted above, the attraction between a magnet and the core of its associated solenoid arrests the motion of the drive ring and the magnets stops in axial alignment with the core of the solenoid due to magnetic attraction. For example, if on opening the inertia of the system carries the magnet 36 slightly beyond the core of its associated solenoid 22, the magnetic attraction between the magnet 36 and the core of the solenoid 22 will pull the two back into alignment. In this fashion the motion of the drive ring is arrested and damped without a mechanical damper and the shutter is stable and locked in both the open and closed positions.

In the embodiment of FIGS. 1-4 two permanent magnets and two solenoids are used and the control 40 acts to reverse the current applied to the solenoids to open and close the shutter. In this embodiment the shutter blades are stable in both the open and closed positions when the solenoids are not energized and there is no mechanical damper or stop, that is contacted during opening or closing to absorb the impact produced by the shutter blades on opening and closing. The embodiment of FIG. 5 utilizes a single solenoid and a single permanent magnet.

Figure 5:
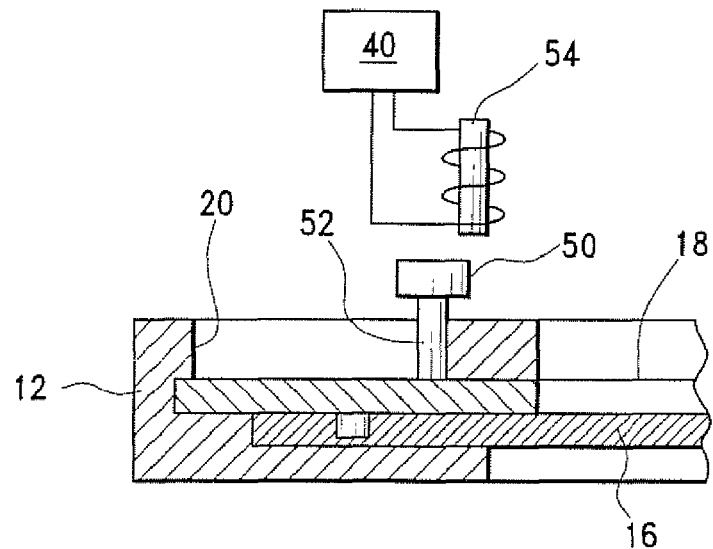
FIG. 5 is a view similar to FIG. 3 only showing another embodiment of the invention.

In this respect FIG. 5 shows a single magnet 50 carried by a post 52, which in turn is connected to the drive ring 18. A single solenoid 54 has its axis off set from the magnet 50. When no current is applied to the solenoid by the control 40, the natural magnetic attraction between the core of the solenoid 54 and the magnet 50 pulls the magnet toward the solenoid core. This holds the magnet and therefore the drive ring 18 at one end of its path of travel representing the shutter closed position. In the closed position shown, the end of the path of travel either can be defined by the engagement of the post 52 with one end of the opening 20 through the base plate 12 as shown, or by a mechanical damper (not shown).

To open the shutter, the controller 40 energizes the solenoid 54 to produce a polarity that is the same as that of the permanent magnet 50. Accordingly the magnet 50 is repelled away from the solenoid 54. Repelling the magnet causes the drive plate 18 to rotate to a shutter open position. When the controller 40 removes current from the solenoid the magnetic attraction between the magnet 50 and the core of the solenoid 54 returns the drive ring to the shutter closed position.

This embodiment is primarily useful in situations where the shutter is open only for a short period or where several rapid cycles are desired. This is because holding the shutter open requires either that the solenoid stay energized or a mechanical latching mechanism be employed. Also the timing of both applying a current to the solenoid and cutting off power may be such as to prevent the shutter blades from over opening or over closing so that no mechanical damper is required. For example, on opening, the power to the solenoid may be cut off prior to the shutter blades being at the full open position so as to allow the inertia of the blades to move them to the full open position and not beyond. Conversely, as the shutter is closing, the solenoid can be energized to repel the magnet prior to the time that the shutter blades reach the full closed position.

Figure 6:
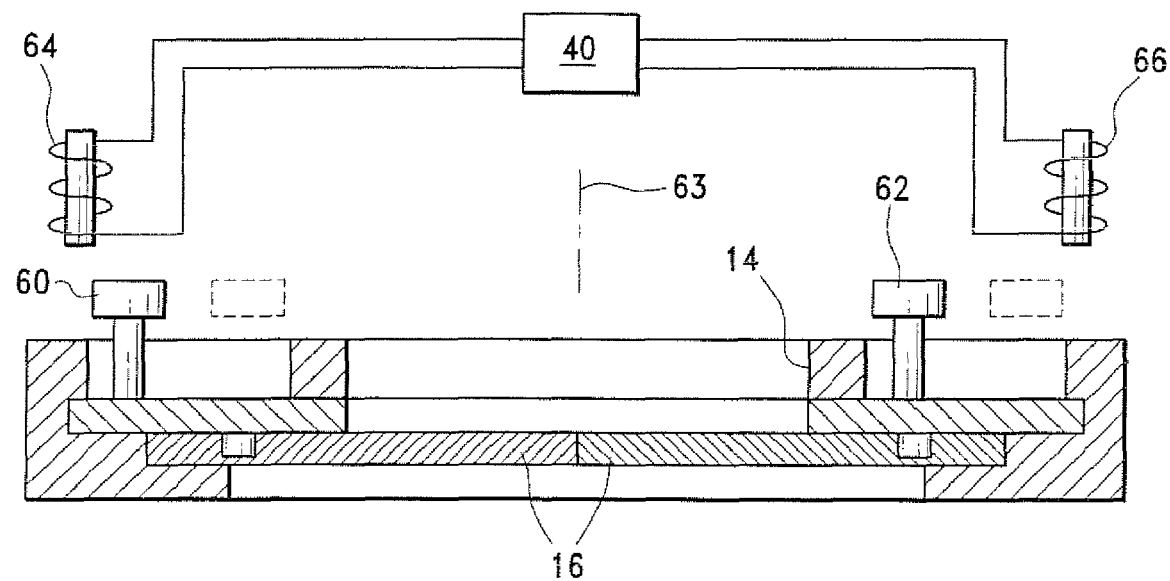
FIG. 6 is a view similar to FIG. 3 showing still another embodiment of the invention.

Still another embodiment is illustrated in FIG. 6. This embodiment utilizes two permanent magnets and two solenoids but eliminates the need to reverse the polarity of the solenoids as in the embodiment of FIGS. 3 and 4. FIG. 6 also illustrates that the magnets 60, 62 can be disposed to either side of the centerline 63 of the shutter opening 14 instead of on the same side as shown in the previous embodiments.

In the FIG. 6 embodiment one of the magnets indicated at 60 is slightly offset from the core of its associated solenoid 64 whereas the magnet 62 is separated from the core of its associated solenoid 66 by a greater distance. With the shutter blades 16 in a closed position the distance between magnet 62 and solenoid 66 is too great to overcome the attraction of the magnet 60 to the core of solenoid 64 so the shutter remains stable and in the closed position with no power supplied to either coil.

To open the shutter blades, current is applied only to solenoid 64 so as to produce a polarity in the solenoid that acts to repel the magnet. The desired direction of motion is induced by the offset so the magnet 60 moves to the position shown in dotted line. This rotates the drive plate to pivot the shutter blades to an open position. Once the magnet 60 is repelled away, it is too far from the core of its associated solenoid 64 to be pulled back by magnetic attraction when current to the solenoid 64 is shut off.

As the drive plate rotates, it carries the magnet 62 closer to its associated solenoid 66 until it reaches the dotted line position, which is the end of travel. In this position the magnet 62 is held to the core of its associated solenoid 66 by magnetic attraction and the shutter blades remain locked in the open position even when no power is applied to either solenoid.

To close the shutter and return the shutter blades to the FIG. 6 position power is applied to solenoid 66 to produce a polarity that repels the magnet 62 so as to move it back to the solid line position. This also moves the magnet 60 back to its solid line position where it is held by magnetic attraction to the core of its associated solenoid 64.

While the embodiment of FIG. 6 uses an electromagnetic force to open and close a rotary shutter, it is not preferred as the system would require a mechanical damping system.

Still another embodiment is illustrated in FIGS. 7 and 8. This embodiment uses one permanent magnet 78 and two solenoids 82, 84 together with two mechanical dampers 74, 76 that engage the permanent magnet 78 at the open and closed ends of its range of travel.

In the FIG. 7 embodiment, in which the shutter is shown closed, the magnet indicated at 78 is resting against the stop surface of a damper 76. Associated solenoid 84 is offset from the rest position of the magnet 78 so that the magnetic field created by the solenoid 84 continues to attract the magnet 78 in its rest position.

An opposing damper 74 is disposed in a corresponding position relative to the position of the magnet 78 when the shutter is in the open position as shown in FIG. 8. In the open position, the magnet 78 rests against a stop surface of the damper 74 and the associated solenoid 82 is positioned so that when energized it continues to attract the magnet 78 causing it to come to a stop resting against the stop surface of the damper 74. The second solenoid 82 is positioned so that the magnetic field created by the solenoid 82 continues to attract the magnet 78 causing it to move into a position resting against the stop surface of the damper 74.

Referring again to FIG. 7, to open the shutter blades, current is applied to the solenoid 84 to create a field that repels the magnet 78 while substantially simultaneously, current is applied to the solenoid 82 to create a magnetic field that attracts the magnet 78. It will be understood that while applying current to both solenoids 82, 84 substantially simultaneously provides an effective opening action, it isn't necessary that the currents be applied simultaneously. For example, current could be applied first to solenoid 84 to create a repelling magnetic field and then subsequently, as the magnet 78 moves towards the other damper 74, current could then be applied to the solenoid 82 to create an attracting magnetic field. The current to solenoid 84 could either be maintained or cut off depending on the characteristics of the opening motion desired. Energizing both solenoids 82, 84 creates the largest force on the magnet 78 while sequentially energizing the solenoids or in the alternative energizing only one of the solenoids to either attract or repel the magnet 78, provides less force to the drive ring 18. In addition, the current to the solenoids 82, 84 can be modulated to control the movement of the magnet 78 between the shutter open and shutter-closed positions. For example, pulses of varying width could be applied to the two solenoids 82, 84, the polarity of the current applied to the solenoids 82, 84 could be reversed at various points during the movement of the magnet 78 to either accelerate the magnet 78 or decelerate the magnet 78, or the movement of the magnet 78 could be controlled so as to, for example, increase the size of the shutter opening 14 linearly over time or according to any other desired characteristic.

While the embodiment of the invention shown in FIG. 7 and 8 shows a single set of solenoids 82, 84 and a single magnet 78, multiple magnets and multiple pairs of solenoids may be coupled to the drive ring 18 at various radial positions around the shutter opening. Using multiple sets of solenoids and magnets reduces the amount of current that must be applied to each solenoid to generate the same force on the drive ring 18.

It will also be appreciated that while the embodiment shown in FIGS. 7 and 8 shows a set of solenoids 82, 84 associated with a single magnet 78, variations on this arrangement can also be employed. For example, multiple magnets can be provided at radially spaced positions around the shutter opening 14 and one solenoid 82 or 84 can be associated with each magnet 78. In one example, solenoid 82 could be associated with the first magnet and solenoid 84 associated with the second magnet. Since the magnets are mechanically coupled by the drive plate, a multiplicity of arrangements can be contemplated.

Similarly, it is not necessary that the dampers be physically associated with the magnet or with the magnet that is driven. Any of the dampers known to those skilled in the art could be coupled to the drive ring at a location remote from the magnet and solenoids and still provide effective damping action.

Another embodiment of the invention is shown in FIGS. 9, 10, 11, and 12. Referring first to FIG. 9, a shutter in accordance with this invention is illustrated in a top plan view. Shutter 10 includes a base plate 12, a shutter opening 14 and a plurality of shutter blades 16. A pair of solenoids 22 and 24 are arranged on the base plate in radially spaced apart locations on opposite sides of the shutter opening 14. As may be more clearly seen in FIG. 10 which is a section taken a long line 10-10 of FIG. 9, first and second magnets 60 and 62 are coupled to a drive ring 18 which is in turn coupled to the shutter blades 16. Magnets 60 and 62 are mounted on the drive ring in oppositely pulled configurations, that is to say, the north pole of magnets 60 is on top while the north pole of magnets 62 is on the bottom, or vice versa.

Solenoid 24 includes a core 25 of magnetic material such as a ferrous material surrounded by a coil 27 wound on a bobbin 29. Preferably, in this and the other embodiments, core 25 is made from a material with a low coercive force such as M6 grain oriented 3.3% silicon steel, manufactured by Magnetic Metals of Camden N.J. under the trademark Microsil, to allow the coil 27 to quickly revert to an unmagnetized state when the coil is deenergized and to allow the coil to switch polarity relatively rapidly from one magnetic orientation to the other while retaining only minimal residual magnetism. By applying a signal of appropriate polarity to coil 27, core 25 can be temporarily forced to assume a magnetic state in which the North Pole is either on the top or on the bottom depending on the polarity of the signal. For example, if magnet 60 is arranged with its north pole up, and solenoid 24 is energized so that its north pole is on the bottom, core 25 will repel magnets 60 and attract magnet 62. This is the configuration shown in FIG. 10. This arrangement causes the magnets 60 and 62 to drive the drive ring from the position shown in FIG. 10 to the position shown in FIG. 12. This arrangement uses both the attractive and repulsive forces existing between solenoid 24 and magnets 60 and 62 to move the drive ring and to move the shutter from the closed position shown in FIG. 9 to the open position shown in FIG. 11. Once the shutter reaches the configuration shown in FIG. 12, power is removed from solenoid 24. Because core 25 is made from magnetic material, magnet 62 is attracted to core 24 even when the core is not energized and this maintains the shutter in the open position.

To move the shutter from the open position shown in FIGS. 11 and 12 to the closed position shown in FIGS. 9 and 10, the solenoid is energized so that its south pole is on the bottom. This repels magnet 62 and simultaneously attracts magnet 60 thereby rotating the base plate to the position shown in FIG. 10 and closing the shutter. When the magnet sizing signal is removed from coil 27, magnet 60 continues to be attracted to core 25 and this holds the shutter in the closed position.

To move from the open position shown in FIG. 12 to the closed position shown in FIG. 10, a signal is applied to solenoid 24 that is opposite in polarity from the signal just discussed. This causes core 25 to be temporarily magnetized Optionally, a second solenoid 22 and a second pair of magnets can be provided for increasing the force on the base plate and thereby increasing the speed at which the shutter opens and closes, or decreasing the power that must be applied to the coil to produce the same opening/closing speed as can be produced by a single coil.

Preferably, the shutter 10 is provided with a damper 70. The damper 70 includes a slot 72 formed in the base plate 12 through which a pin 73 a projects upwardly. The slot is preferably provided with damping material such as a ring 75 surrounding the slot, or blocks of energy absorbing plastic or similar material at the ends of the slot. Examples of suitable damping material are described in U.S. Pat. No. 6,652,165. The damper increases the life cycle of the shutter by softening the shock that would otherwise occur as a solenoid moves to shutter from the fully open to the fully closed position. In addition, the damper quiets the shutter which may be important in certain applications.

The damper may be arranged in a variety of ways. While it is possible for the shutter blades themselves to be directly coupled to the damping system if the shutter blades are relatively sturdy, this is presently not preferred if the shutter blades are very thin and susceptible to damage on impact. Preferably, the damper is separate from the solenoid actuator and from the magnets as shown in FIGS. 9 through 12.

Alternatively, the damper may be arranged to directly engage the magnets. The configuration of the damper would be substantially the same as the configuration shown in FIGS. 9 and 11 but the damper 75 would be arranged with respect to one or both of the magnets 60 and 62, to provide the same sort of damping action provided with respect to pin 73 in FIGS. 9 and 11.

As another alternative, the damper may be arranged to dampen motion between the base plate and the drive ring.

Preferably, in all arrangements of the damper, the damper material is arranged to engage the magnet or pin at a position at least slightly before the position that the magnet or pin would reach if the damper were not present. This ensures that the damper controls the end position rather than the combination of the magnet and solenoid controlling the end position. It also ensures that when the magnet is retained in his position by virtue of the magnetic force between the magnet and the solenoid core, that position is fixed by the damper and known in advance.

Moreover, in each of the embodiments described herein, the one or more permanent magnets may be movable along a substantially arcuate path in response to changes in the electrical current applied to the one or more solenoids and, thus, in response to variations in the magnetic field created proximate the one or more solenoids. For example, the electrical current and the magnetic field may be varied while the plurality of shutter blades 16 is transitioned between the open and closed positions. Such variations may be controlled by the user as desired in order to produce a variable shutter opening and/or shutter closing pattern as necessary for different shutter assembly applications. For example, the shutter blades 16 may be controlled to accelerate and/or decelerate while transitioning between the open and closed positions. Such acceleration may be, for example, linear, stepwise, and/or exponential. Alternatively, the plurality of shutter blades 16 may be controlled during the transitioning to have any other velocity, acceleration, and/or movement pattern useful in shutter applications. The movement of the shutter blades 16 may cause a corresponding change in the area of the central opening 14 that is exposed by the various shutter assemblies described herein. Thus, the area of the central opening 14 that is exposed may be varied, for example, in a linear, stepwise, exponential, and/or other manner as dictated by the controlled movement of the plurality or shutter blades 16.

In addition, the acceleration, deceleration, and/or other movement of the shutter blades 16 may be controlled using a closed loop feedback control strategy. For example, the shutter assemblies of the present disclosure may be servo-driven to assist in accelerating, decelerating, and/or otherwise modifying the movements of the plurality of shutter blades 16 while transitioning the plurality of shutter blades 16 between the open and closed positions. The shutter assemblies described herein may additionally comprise any combination of sensors, sensor components, sensor assemblies, and/or other devices to facilitate the closed loop control of the position and/or movement of, for example, the drive ring 18, the one or more permanent magnets, and/or the plurality of shutter blades 16.

In each of the exemplary embodiments described herein, an electrical signal applied to the one or more solenoids may be increased, reduced, and/or otherwise varied. For example, an electrical current provided to the one or more solenoids may be reduced, increased, varied, modified, and/or otherwise modulated to control the movement of the one or more magnets relative to, for example, the solenoid coils, and/or the one or more dampers and/or stops. Such variations in the current may, for example, cause a related and corresponding variation in the electrical field created by the one or more solenoids. It is also understood that the electrical current provided to the one or more solenoids and/or the magnetic field created by the one or more solenoids may be altered, varied, and/or otherwise modified in response to a sensed position of the one or more permanent magnets relative to the dampers, stops, solenoids, and/or other stationary components of the shutter assemblies described herein.

In an exemplary embodiment, varying the electrical current may include reversing a polarity of the currents supplied to at least one of the solenoids. For example, the polarity of the electrical currents may be controllably varied by the controller 40 to controllably attract and/or repel the one or more permanent magnets. In exemplary embodiments that include a pair of solenoids, the polarity of the current applied to a first solenoid may result in a south pole being formed at the first solenoid and the polarity of the electrical current applied to the second solenoid may result in a north pole being formed at the second solenoid. Reversing the polarity of the electrical currents supplied to their respective solenoids may, in turn, form a north pole at the first solenoid and a south pole at the second solenoid, thereby modifying the movement of the one or more permanent magnets.

In addition, the polarity of the electrical current applied to the one or more solenoids may be alternated and/or otherwise repeatedly reversed during the transition of the shutter blades 16 between the open and closed positions. Such a variation in the current may cause a corresponding variation in the magnetic field created by the one or more solenoids, and may cause the one or more permanent magnets to accelerate and/or decelerate while traveling relative to the one or more solenoids. For example, the polarity of the electrical current may be reversed at least once and/or repeatedly during the transitioning of the plurality of shutter blades to magnetically dampen the movement of the one or more permanent magnets. Such variations in the electrical current, and such corresponding variations in the magnetic field, may alternately attract and repel the one or more permanent magnets of the shutter assemblies described herein.

In addition, the electrical current applied to the one or more solenoids and/or the magnetic field created by the one or more solenoids may be varied by, for example, applying an electrical current pulse to one or more of the solenoids. In an exemplary embodiment, at least one pulse may be provided and, in an additional exemplary embodiment, a plurality of pulses may be provided. It is understood that the one or more pulses may be provided to at least one of the solenoids in exemplary embodiments containing more than one solenoid. The exemplary pulses applied to the one or more solenoids may be of varying widths and/or may be applied to the one or more solenoids for varying lengths of time. Applying such pulses of electrical current to the one or more solenoids of the present disclosure may controllably accelerate or controllably decelerate the one or more magnets and/or the drive ring 18 during movement. In particular, such pulses may be provided to controllably accelerate or decelerate the one or more magnets while transitioning the plurality of shutter blades 16 between the open and closed positions. Such accelerated or decelerated movements will result in a corresponding accelerated or decelerated movement of the plurality of shutter blades 16 connected to the drive ring 18. Accordingly, the amount and/or area of the central opening 14 exposed by the movement of the shutter blade 16 between the open and closed positions can be controlled through the proper timing, duration, and magnitude of such pulses.

As shown in, for example, FIGS. 13-16, the exemplary shutter assemblies of the present disclosure may also include at least one sensor 90 configured to detect a position of the permanent magnets and/or a position of the drive ring 18. It is understood that such positions may be radial positions with respect to, for example, the opening 20, the one or more solenoids, the one or more dampers, the one or more stops, and/or other stationary components of the shutter assemblies. The embodiment shown in FIG. 13 corresponds to the embodiment described above with respect to FIG. 5, the embodiment shown in FIG. 14 corresponds to the embodiment described above with respect to FIG. 7, the embodiment of FIG. 15 corresponds to the embodiment described above with respect to FIG. 10, and the embodiment shown in FIG. 16 corresponds to the embodiment described above with respect to FIG. 6. In addition, the one or more sensors 90 shown in FIGS. 13-16, may be part of a sensor assembly disposed within and/or proximate to the respective shutter assembly.

Figure 13:
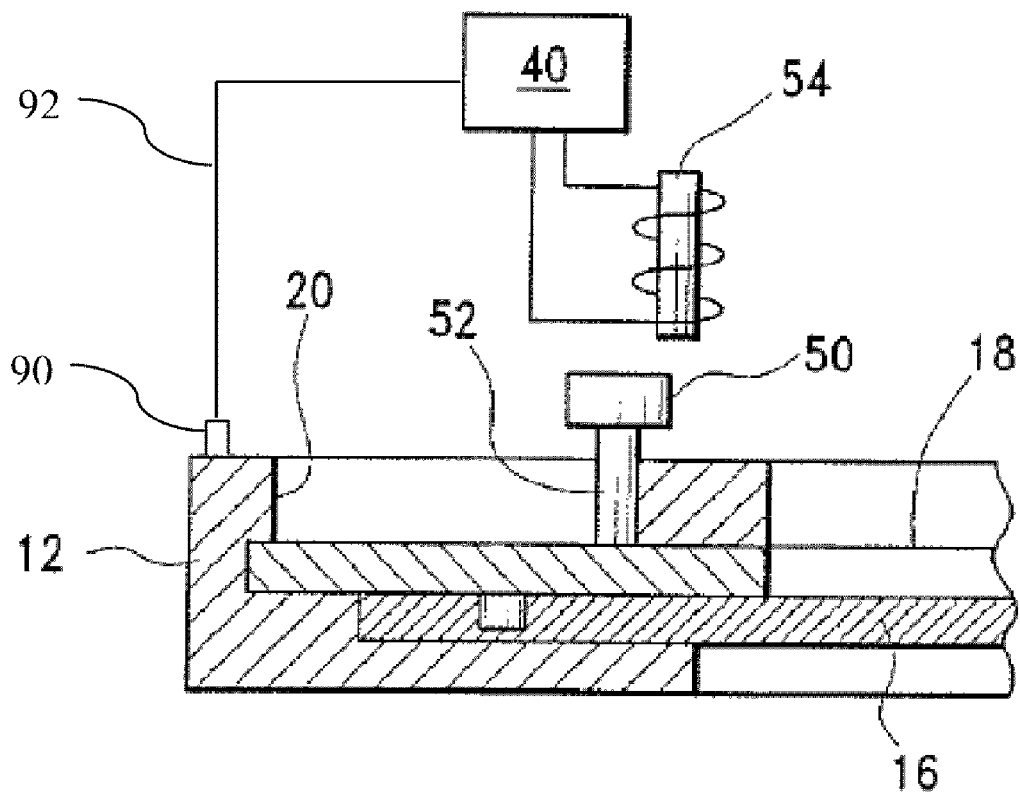
FIG. 13 is a cross-sectional view of a portion of the shutter assembly as shown in FIG. 1 according to another exemplary embodiment of the present disclosure.
Figure 14:
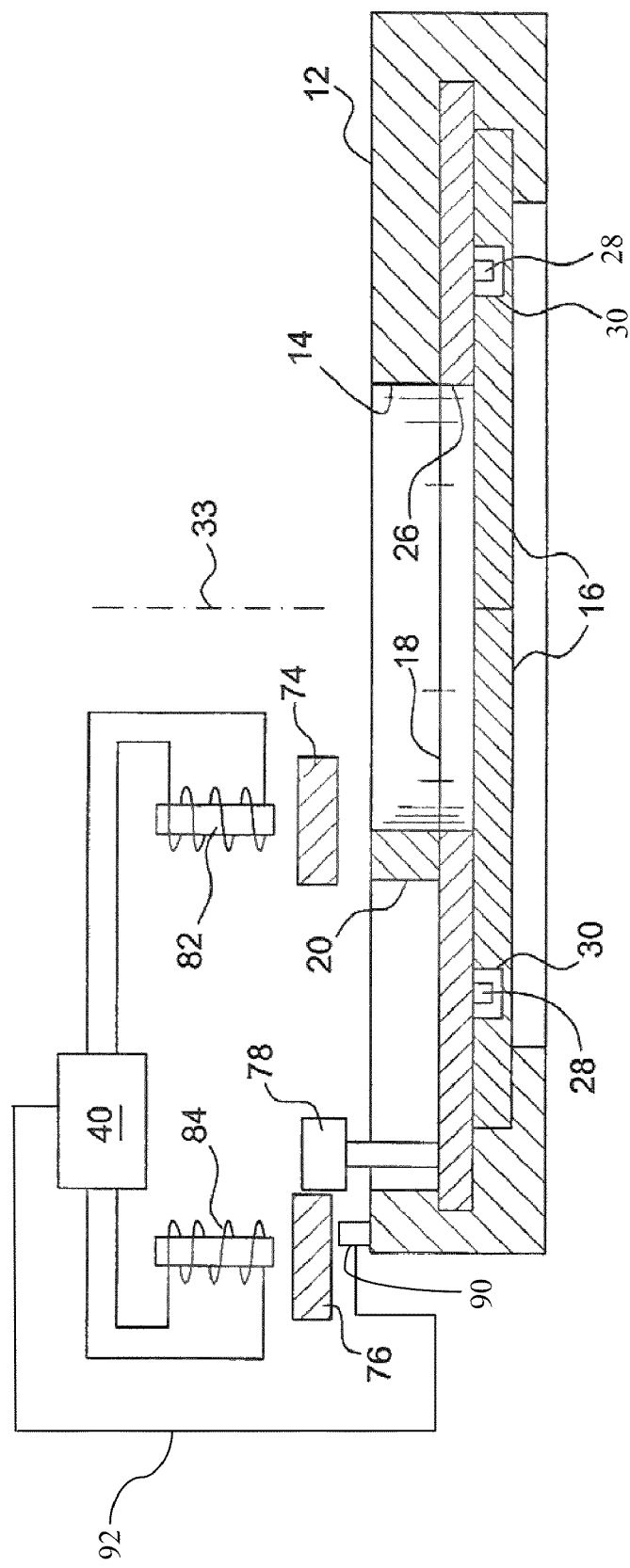
FIG. 14 is a cross-sectional view of a shutter assembly according to still another exemplary embodiment of the present disclosure.
Figure 15:
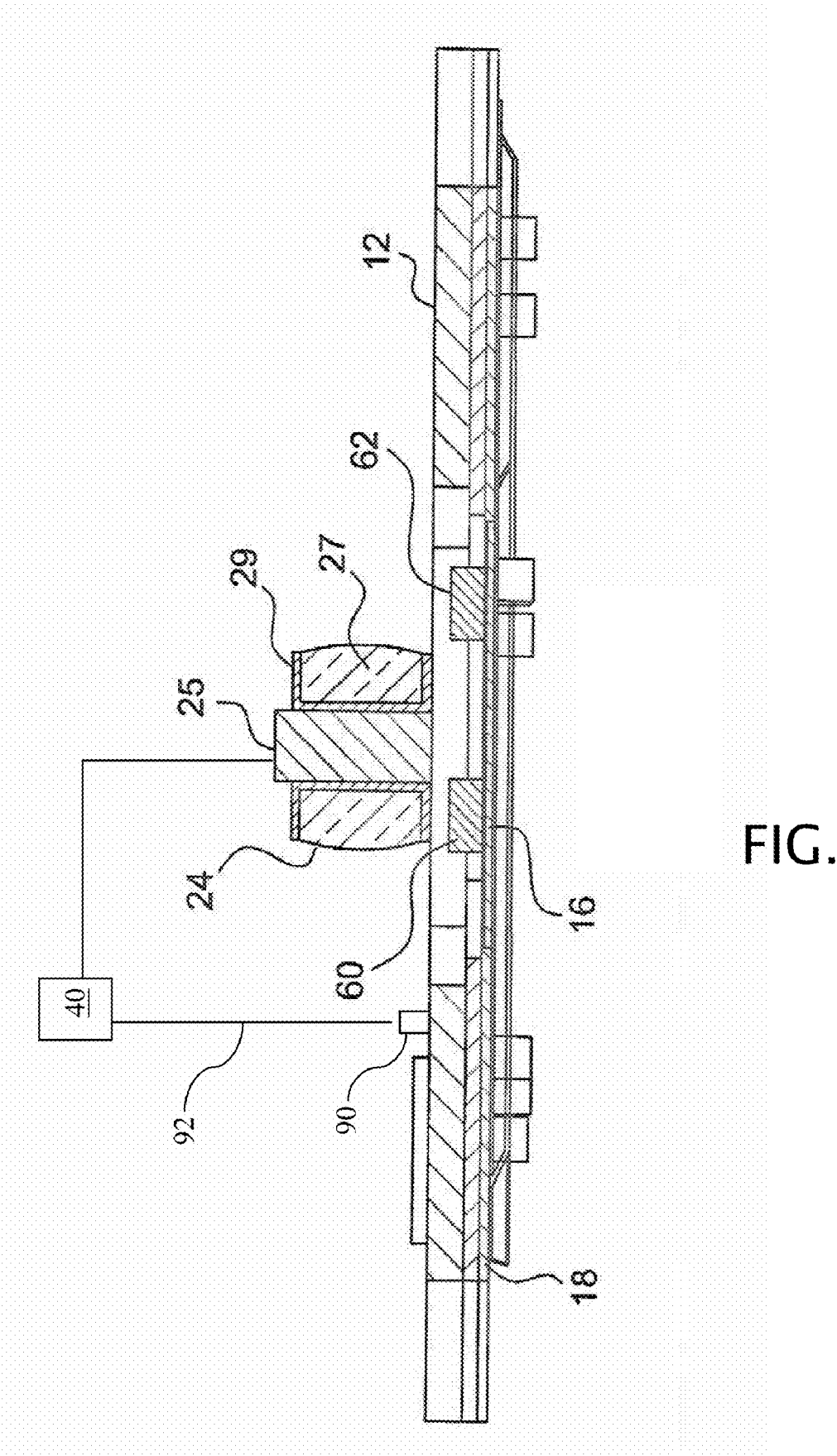
FIG. 15 is a cross-sectional view of a shutter assembly according to still another exemplary embodiment of the present disclosure.

The one or more sensors 90 may comprise any type of electromagnetic and/or position sensor known in the art. For example, the sensor 90 may comprise a position sensor mounted in a stationary location with respect to the drive ring 18, as shown in FIG. 13. Such a position sensor may include a Hall effect sensor, an infrared sensor, and/or any other known sensor. The sensor 90 may be configured to detect the position of the permanent magnet 50 disposed on the drive ring 18 and may send a feedback signal to, for example, the controller 40. From such feedback signals, the controller 40 may determine the position of, for example, the drive ring 18, the magnet 50, and/or the plurality of shutter blades 16. It is understood that the sensed position of the permanent magnet 50 may be a radial position. In response to the calculated positions of the shutter assembly components, the controller 40 may, for example, send a desired electrical current to the solenoid 54. In particular, the controller may receive the feedback signal via the control line 92 and may alter, modify, vary, and/or otherwise adjust the electrical current provided to the solenoid 54 in response to the sensed and/or calculated position of the shutter blade 16. Varying the current in this way may cause a corresponding variation in the magnetic field created by the solenoid 54. It is also understood that in additional exemplary embodiments, the sensor 90 may be disposed at a remote location relative to the magnet 50. In such an exemplary embodiment, the sensor assembly may further include an additional magnet disposed proximate the sensor 90. The additional magnet may be disposed on, for example, the drive ring 18, one of the shutter blades 16, and/or another moving component of the shutter assembly. In such an exemplary embodiment, the sensor 90 may be configured to detect the position of the additional magnet for calculating the positions of, for example, the drive ring 18, the magnet 50, and/or the plurality of shutter blades 16.

Figure 16:
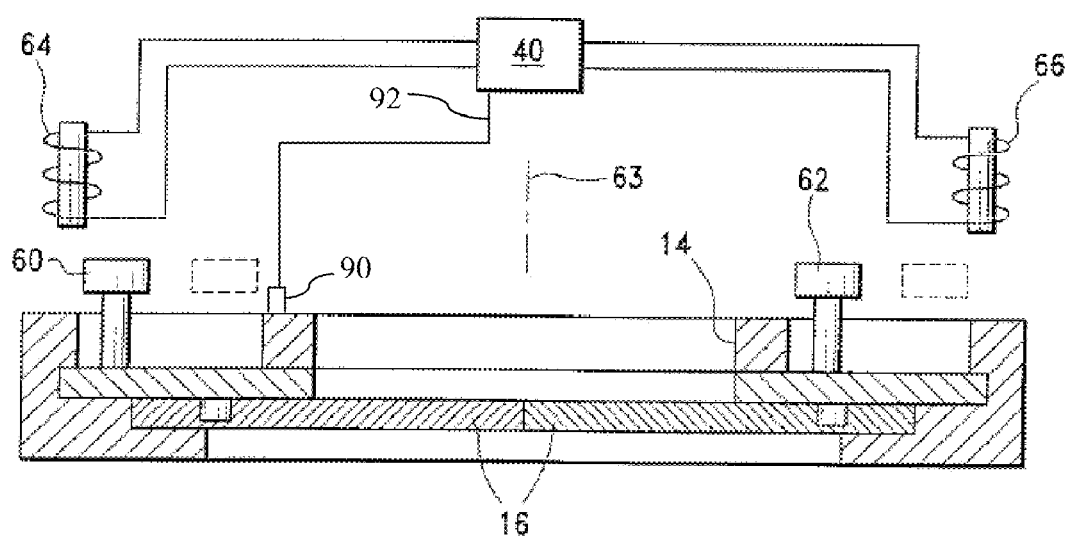
FIG. 16 is a cross-sectional view of a shutter assembly according to still another exemplary embodiment of the present disclosure.

Thus, in the exemplary embodiments described herein and illustrated in at least FIGS. 13-16, the shutter assembly may be servo-driven and may incorporate one or more feedback control loops as part of the preprogrammed logic used to control motion and/or position of the shutter blades 16. In such an exemplary embodiment, the controller 40 may be preprogrammed with a desired set point corresponding to, for example, a position of the shutter blades 16 at the open or closed position. The sensor 90 may then detect the position of the magnet 50 and the controller 40 may convert this position information to an acceptable format for comparison with the preprogrammed set point. The controller 40 may then compare the converted position value with the preprogrammed set point. In an exemplary embodiment, if the preprogrammed set point is greater than the sensed position value, the controller 40 may direct an electrical current to the solenoid 54 to repel the magnet 50 and rotate the drive ring 18 in a first direction. Alternatively, if the preprogrammed set point is less than the sensed position point, the controller 40 may send an electrical current to the solenoid 54 to attract the magnet 50 and rotate the drive ring 18 in a second direction. Such feedback control may continue until the shutter blades 16 are desirably opened or desirably closed. It is understood that such feedback control may be utilized to alternately attract and/or repel the one or more magnets during the transitioning of the shutter blades 16 between the open and closed position regardless of the configuration of the shutter assembly. In particular, such feedback control may be utilized with any combination of solenoids and magnets such as, embodiments having a single solenoid 54 and a single magnet 50 (FIG. 13), a pair of solenoids 82, 84, and a single magnet 78 (FIG. 14), a pair of magnets 60, 62, and a single solenoid 24 (FIG. 15), and a pair of magnets 60, 62, and a pair of solenoids 64, 66 (FIG. 16).

In still another exemplary embodiment of the present disclosure, the sensor 90 may comprise a current sensor configured to sense at least one property of an electrical current passing to the solenoid. Such a property may include, for example, a voltage of the electrical current and/or a flow of electrical charge (Amperes). In still another embodiment of the present disclosure, the sensor 90 may comprise a micromagnet mounted to one or more of the shutter blades 16, and a corresponding transponder mounted to a stationary component of the shutter assembly to detect the relative motion and/or position of the micromagnet. In still a further exemplary embodiment, the sensor assembly may comprise a flag or other structure mounted to, for example, the drive ring 18, the permanent magnet, and/or one or more of the shutter blades 16. In such an exemplary embodiment, the sensor assembly may further include a corresponding sensor 90 configured to detect the position of the flag.

Accordingly, it should be appreciated that the present invention accomplishes its intended objects in that it provides an operating system for a shutter that eliminates the need for a mechanical linkage to open and close the shutter. It also provides a shutter that is opened and closed by an electromagnetically driven operating system and which, in at least one embodiment eliminates the need for mechanical damping.

Having described the invention in detail, what is claimed as new is:

1. A shutter assembly, comprising:
a) a plurality of shutter blades movable between an open position and a closed position;
b) a drive ring having first and second oppositely-facing sides, at least one of the shutter blades being movably coupled to the first side;
c) a first permanent magnet coupled to the second side of the drive ring;
d) a first solenoid selectively energizable to alternately attract and repel the first permanent magnet along an arcuate path beneath the first solenoid, thereby transitioning the plurality of shutter blades between the open and closed positions; and
e) a sensor assembly configured to detect a change in distance between the sensor assembly and the first permanent magnet as the first permanent magnet moves along the path.

2. The shutter assembly of claim 1, wherein the sensor assembly is configured to sense a property of an electrical current passing through the solenoid.

3. The shutter assembly of claim 2, wherein the property comprises at least one of voltage and flow.

4. The shutter assembly of claim 1, wherein the sensor assembly is configured to detect the location of the first permanent magnet relative to a stop configured to limit motion of the drive ring.

5. The shutter assembly of claim 1, wherein the sensor assembly comprises a Hall effect sensor.

6. The shutter assembly of claim 1, wherein the sensor assembly comprises a micromagnet mounted to one of the plurality of shutter blades.

7. The shutter assembly of claim 1, wherein the sensor assembly comprises a flag mounted to the permanent magnet.

8. The shutter assembly of claim 1, wherein the sensor assembly comprises a driver and is configured to send a feedback signal, indicative of the location of the first permanent magnet, to the driver.

9. The shutter assembly of claim 8, wherein the feedback signal is indicative of a location of at least one of the plurality of shutter blades.

10. The shutter assembly of claim 8, wherein the driver is configured to alter an electrical current sent to the first solenoid in response to the feedback signal.

11. The shutter assembly of claim 1, further including a second solenoid disposed proximate first permanent magnet and configured to alternately attract and repel the magnet along the path.

12. The shutter assembly of claim 1, further including a second permanent magnet coupled to the second side of the drive ring, the first and second magnets being offset from the first solenoid when the plurality of shutter blades is in both the open and closed positions.

13. The shutter assembly of claim 1, wherein the sensor assembly comprises a sensor disposed a first distance from the first permanent magnet when the plurality of shutter blades is in the open position, and a second distance from the first permanent magnet, different than the first distance, when the plurality of shutter blades is in the closed position.

14. The shutter assembly of claim 1, wherein the sensor assembly comprises an infrared sensor.

15. The shutter assembly of claim 1, wherein the first permanent magnet maintains a substantially constant angular orientation with respect to the sensor assembly as the first permanent magnet moves along the path.

16. The shutter assembly of claim 1, wherein the sensor assembly is configured to sense a change in radial position of the first permanent magnet about an opening of the shutter assembly.

17. The shutter assembly of claim 1, wherein a first magnetic pole of the first permanent magnet faces the second side of the drive ring opposite the sensor assembly, and a second magnetic pole of the first permanent magnet faces the sensor assembly.

18. The shutter assembly of claim 1, further including a controller configured to modify a current sent to the first solenoid in response to the detected change in distance between the sensor assembly and the first permanent magnet.

19. A shutter assembly, comprising:
a plurality of shutter blades movable between an open position and a closed position;
a drive ring having first and second oppositely-facing sides, at least one of the shutter blades being movably coupled to the first side;
a first permanent magnet coupled to the second side of the drive ring, wherein movement of the first permanent magnet is controlled to transition the plurality of shutter blades between the open and closed positions;
a solenoid selectively energizable to alternately attract and repel the first permanent magnet along an arcuate path;
a second permanent magnet disposed remote from the first permanent magnet and the solenoid, the second permanent magnet being moveable in response to movement of the first permanent magnet; and
a sensor assembly remote from the first permanent magnet, the sensor assembly configured to detect a change in distance between the sensor assembly and the second permanent magnet as the first permanent magnet moves along the path.

20. A shutter assembly, comprising:
a plurality of shutter blades movable between an open position and a closed position;
a drive ring having first and second oppositely-facing sides, at least one of the shutter blades being movably coupled to the first side;
a first permanent magnet coupled to the second side of the drive ring;
a first solenoid selectively energizable to alternately attract and repel the first permanent magnet along an arcuate path beneath the first solenoid, thereby transitioning the plurality of shutter blades between the open and closed positions; and
a sensor assembly configured to detect a location of the first permanent magnet along the path, wherein the sensor assembly comprises a micromagnet mounted to one of the plurality of shutter blades.

21. A shutter assembly, comprising:
a plurality of shutter blades movable between an open position and a closed position;
a drive ring having first and second oppositely-facing sides, at least one of the shutter blades being movably coupled to the first side;
a first permanent magnet coupled to the second side of the drive ring;
a first solenoid selectively energizable to alternately attract and repel the first permanent magnet along an arcuate path beneath the first solenoid, thereby transitioning the plurality of shutter blades between the open and closed positions; and
a sensor assembly configured to detect a location of the first permanent magnet along the path, wherein the sensor assembly comprises a flag mounted to the permanent magnet.

* * * * *